US007461816B2

(12) United States Patent
Schwartz et al.

(10) Patent No.: US 7,461,816 B2
(45) Date of Patent: Dec. 9, 2008

(54) INTERNAL ARRANGEMENT OF THE WALLS OF THE FUSELAGE OF AN AIRCRAFT

(75) Inventors: Bruno Schwartz, Tournefeuille (FR); Richard Tanguy, Tournefeuille (FR); Jacques Quesnel, Saiguede (FR); Francis Munch, Habsheim (FR)

(73) Assignee: Eads Sogerma Services, Merignac (FR)

( * ) Notice: Subject to any disclaimer, the term of this patent is extended or adjusted under 35 U.S.C. 154(b) by 535 days.

(21) Appl. No.: 11/109,677

(22) Filed: Apr. 20, 2005

(65) Prior Publication Data
US 2005/0236523 A1 Oct. 27, 2005

(30) Foreign Application Priority Data
Apr. 27, 2004 (FR) ................... 04 04435

(51) Int. Cl.
*B64C 1/00* (2006.01)
(52) U.S. Cl. .................... 244/117 R; 244/119
(58) Field of Classification Search ............. 244/117 R, 244/118.5, 119, 120; 105/397, 344, 329.1
See application file for complete search history.

(56) References Cited
U.S. PATENT DOCUMENTS
4,490,883 A 1/1985 Gauron

| 5,201,831 | A | 4/1993 | Higgins et al. |
| 5,938,149 | A * | 8/1999 | Terwesten ................ 244/118.5 |
| 6,120,070 | A | 9/2000 | Myers |
| 2006/0237585 | A1 * | 10/2006 | Lau et al. ................ 244/118.5 |

OTHER PUBLICATIONS

Preliminary Search Report dated Dec. 8, 2004.

* cited by examiner

*Primary Examiner*—John W Eldred
(74) *Attorney, Agent, or Firm*—Dickinson Wright, PLLC

(57) ABSTRACT

An internal arrangement of aircraft fuselage walls supports two longitudinal auxiliary passage ducts at the upper part of the fuselage and on each side of its longitudinal plane of symmetry. The arrangement includes a longitudinal central element forming a dome connecting the structural ducts, an interior ceiling panel situated under the dome and facing toward the cabin, and two lateral cover panels. A lower edge of each lateral panel is articulated with respect to the fuselage so that it may occupy a raised position in which it is connected to a respective one of the structural ducts near an upper edge of the structural duct and a lowered position in which it is distant from the structural duct. Also, the upper edge of each lateral panel is extended, in the raised position, beyond the structural duct to cover the corresponding longitudinal edges of the dome and the ceiling panel.

9 Claims, 3 Drawing Sheets

INTERNAL ARRANGEMENT OF THE WALLS OF THE FUSELAGE OF AN AIRCRAFT

FIELD OF THE INVENTION

The invention relates to an internal arrangement of the walls of the fuselage delimiting the passenger cabin of an aircraft and, more particularly, to a luxury internal arrangement of the cabin.

BACKGROUND OF THE RELATED ART

It is known that the internal arrangement of the passenger cabin of an aircraft is dependent on certain technical installations necessary for the correct operation of the aircraft and for the comfort of the passengers and that run through its fuselage. Also, in order to create enough cabin space, these installations are attached along the walls of the fuselage and, in particular, in the upper part. In general, two longitudinal structural ducts spaced apart parallel to one another are supported by fixings at the upper parts of the walls of the fuselage, respectively on either side of the longitudinal plane of symmetry of the fuselage. These ducts accommodate the auxiliaries concerned, that is to say the installations relating in particular to the ventilation, illumination, audio-video equipment, oxygen, etc.

To cover these auxiliaries and other circuits and the walls of the fuselage an internal arrangement is provided which generally comprises:

- a longitudinal central element forming a dome fixedly connecting the two parallel structural ducts;
- a lower central ceiling panel situated under the dome and spaced away from it and facing toward the cabin; and
- two lateral covering assemblies, each extending from the corresponding structural duct as far as the lateral side of the walls of the fuselage and being fixed to said duct and to said fuselage.

Each assembly is therefore made up of three parts. A first part in the form of a curved lateral panel starting from the lateral side of the fuselage and extending as far as the structural duct and fixed to the walls of the fuselage and attached to the corresponding longitudinal edge of the duct concerned; a second part in the form of a flat panel fixedly attached under the structural duct in order to close it off and itself acting as a support for the auxiliaries; and a third part in the form of an edging strip fixed to the other longitudinal edge of said duct concerned and concealing the fixings and the connection between the longitudinal edges of the ceiling panel and the structural duct.

Although they are widely used, these arrangements do have certain disadvantages.

Because of the numerous screw or other connections and the parts involved in making up the arrangement, the sequences of removing and refitting in order to carry out maintenance or change parts of the auxiliaries are complicated, lengthy and involved. For example, in order to gain access to the auxiliaries in one of the structural ducts, it is necessary to remove at least the second and third parts (if not all three in some cases) of the covering assembly concerned, since the second part also acts as a wall of the structural duct. Likewise, in order to access the dome, which is fixed to said ducts, and work on the circuits and the like situated in the space between the dome, the corresponding structural duct and the walls of the fuselage involved, it is necessary to take off the edging strips and the ceiling panel in question, then remove the dome fixings in order then to extract it between the two ducts in a movement which is tricky because it is fixed to these ducts (lifting it then tilting it in order to make it pass between the ducts) and risky.

It will be understood therefore that the excessive number of parts (particularly each covering assembly) and their arrangement (connection of the assemblies with the ducts, dome over the ducts, etc.) contribute to the complexity of the arrangement and to making this arrangement cumbersome.

In addition, esthetically, the visual presence of longitudinal grooves between the parts of the assemblies is unbecoming, and this is detrimental to a specifically luxury arrangement of the cabins for privileged passengers (VIPs). In addition, the space available at the upper part of the cabin cannot be increased because of the fixed relationships between the assemblies and the structural ducts.

SUMMARY OF THE INVENTION

The object of the present invention is to overcome these disadvantages and the invention relates to an internal arrangement of the walls of the fuselage of an aircraft, the design of which makes it possible in particular:

- to reduce its weight;
- to facilitate maintenance operations by reducing the intervention time;
- to improve the esthetic appearance;
- to optimize the useful space in the cabin; and
- to reduce the acoustic noise level in the cabin.

To this end, according to the invention, the internal arrangement of the walls of the fuselage of an aircraft delimiting the passenger cabin and supporting, at the upper part of said fuselage and, respectively, on each side of its longitudinal plane of symmetry, two longitudinal structural ducts spaced apart parallel to one another and through which the aircraft auxiliaries run, comprises:

- a longitudinal central element forming a dome connecting said structural ducts;
- an interior ceiling panel situated under said dome and facing toward said cabin; and
- two lateral cover panels arranged in such a way that:
  - the lower edge of each lateral panel is articulated with respect to said fuselage, about a connection with a longitudinal axis, each panel thus being able to occupy a raised position in which it is connected to the corresponding structural duct near its upper edge and a lowered position in which it is distant from said structural duct; and
  - the upper edge of each lateral panel is extended, in the raised position, beyond said corresponding structural duct to cover the corresponding longitudinal edges of said dome and said ceiling panel.

Thus, by virtue of the invention, by producing each cover assembly of the arrangement as a one-piece pivoting lateral panel, the latter can be disconnected from the corresponding structural duct, which means that work can be done on the auxiliaries inside said duct without removing the panel, making maintenance and inspection operations carried out on said duct, on the interior wall of the fuselage and on the flight equipment and wiring attached thereto easier. This is achieved by virtue of the pivoting nature of each panel that needs simply to be moved from the raised position into the lowered position in order to uncover the structural duct and gain access to the auxiliaries, fixings or the like concealed by the arrangement. Furthermore, the costs of manufacture are thereby greatly reduced and the weight saving is significant partly on account of the elimination of the fixings of the three parts that make up the assembly according to the prior art, on the walls of the fuselage and the structural duct. Producing the lateral panel as a single piece, more closely following the profile of the fuselage and of the duct, and extending its upper edge to conceal the edges and fixings of the ceiling panel and avoid unbecoming grooves, also contribute to improving the esthetic appearance of the cabin by giving the impression of a large volume.

There is thus obtained an appreciable esthetic, functional and structural arrangement of the passenger cabin of an aircraft, which arrangement is particularly suitable for VIP cabins.

In addition, openings are made in that part of each lateral panel that faces said corresponding structural duct so as to allow the auxiliaries installed therein to be used and to operate.

For example, each lateral panel is connected, in its raised position, to its corresponding structural duct by quick latch/unlatch fixing means. Thus the "lateral panel—structural duct" connection is quick and easy to achieve.

Advantageously, the arrangement comprises, along each lateral side of said fuselage, a support section piece fixed longitudinally to said lateral side of the fuselage and along which said lateral panel of the one-piece assembly is mounted such that it can pivot about said connection the axis of which is longitudinal.

As a preference, said connection the axis of which is longitudinal is defined by a hinge one leaf of which is fixed to the lower edge of said lateral panel and the other leaf of which is fixed to said section piece. The simplicity of execution of the connection the axis of which is longitudinal is thus remarkable.

The arrangement is of the type in which an outer trim panel is attached to each cover assembly while at the same time being spaced therefrom. In this case, each outer panel covers, at the bottom, said connection the axis of which is longitudinal and extends, in the upper part, up to near said corresponding structural duct. Each outer panel is connected to said lateral panel, preferably by quick latch/unlatch fixing means.

Furthermore, to make them easier to remove and to refit, said dome is attached from underneath, from said passenger cabin, against said parallel structural ducts and is fixed thereto and said lower ceiling panel is also attached from underneath, from said cabin, against said dome and is fixed thereto and to said structural ducts.

Advantageously, in order to reduce the acoustic noise problems and reduce the acoustic noise level in the cabin, said structural ducts and said section pieces are fixed to the walls of said fuselage by damping elements.

BRIEF DESCRIPTION OF THE DRAWINGS

The figures of the attached drawing will make it easy to understand how the invention may be embodied. In these figures, identical references denote elements which are similar.

DETAILED DESCRIPTION OF THE INVENTION

Figure 1:
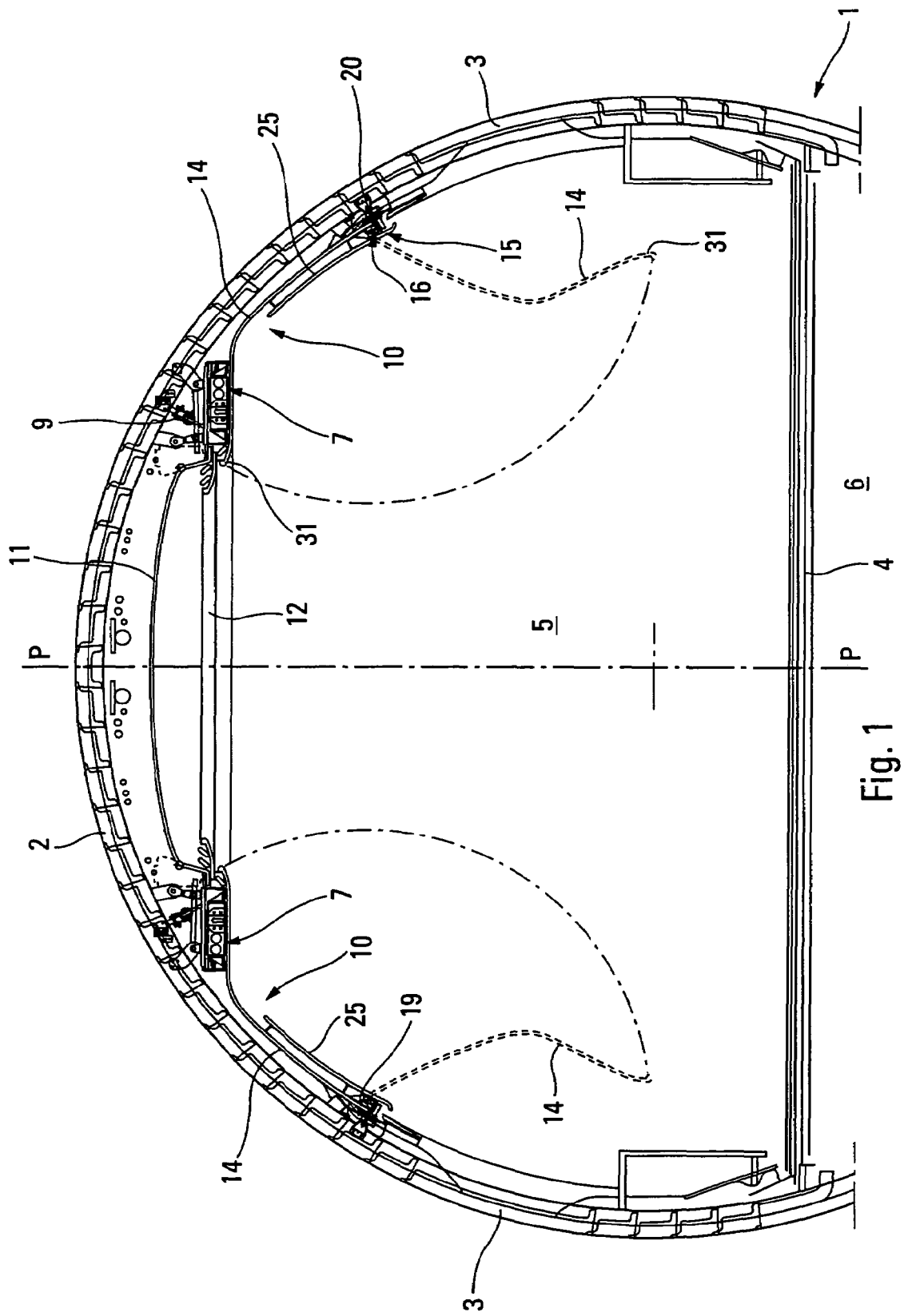
FIG. 1 is a partial and schematic cross section of a fuselage of an aircraft equipped with the arrangement according to the invention.

The fuselage 1 of an aircraft, depicted in FIG. 1, usually comprises assembled structural walls 2 schematically illustrated and incorporating side windows 3 and a floor 4 dividing the interior of the fuselage into an upper compartment 5 for the passengers and members of the crew, hereinafter referred to as the "passenger cabin", and a lower compartment 6 for freight in particular.

In a known way, provided in the space delimited by the passenger cabin 5 are two structural ducts 7 running in parallel along the fuselage and arranged at the upper part thereof and respectively on each side of the vertical longitudinal plane of symmetry P of said fuselage. Running along and fixed to these structural ducts 7 which are spaced apart parallel to one another are various technical installations, not depicted in the figures, intended for ventilation, illumination, audio-video equipment, oxygen, etc. Each duct 7 is produced in particular from assembled metal components 8 and has, in cross section, the shape of a rectangle open at the bottom and fixing elements 9, such as reaction legs and fixing brackets adjustably secure each structural duct to the walls 2 of the fuselage.

The internal arrangement of the fuselage 1 making it possible to conceal the walls of the structure 2, the structural ducts 7 and so on comprises:
    two covering assemblies 10 running respectively along the two lateral sides of the walls 2 of the fuselage 1, from the top of the windows 3 as far as the corresponding structural ducts 7;
    a longitudinal central element 11 forming a dome and closing off the space between the two structural ducts 7; and
    a lower ceiling panel 12 situated under the dome and facing toward the passenger cabin 5.

Quite obviously, depending on the length of the fuselage, several covering assemblies 10, central elements or domes 11, and ceiling panels 12 are placed end to end, one after another respectively.

More particularly, each covering assembly 10 is advantageously made as one piece and comprises a central panel 14 of one piece the transverse profile of which more or less follows the curved lateral side of the walls 2 from the windows 3, then the horizontal base of the structural duct 7. As the two assemblies 10 are identical in this embodiment and as they are arranged symmetrically with respect to the longitudinal plane P, just one will be described.

Figure 2:
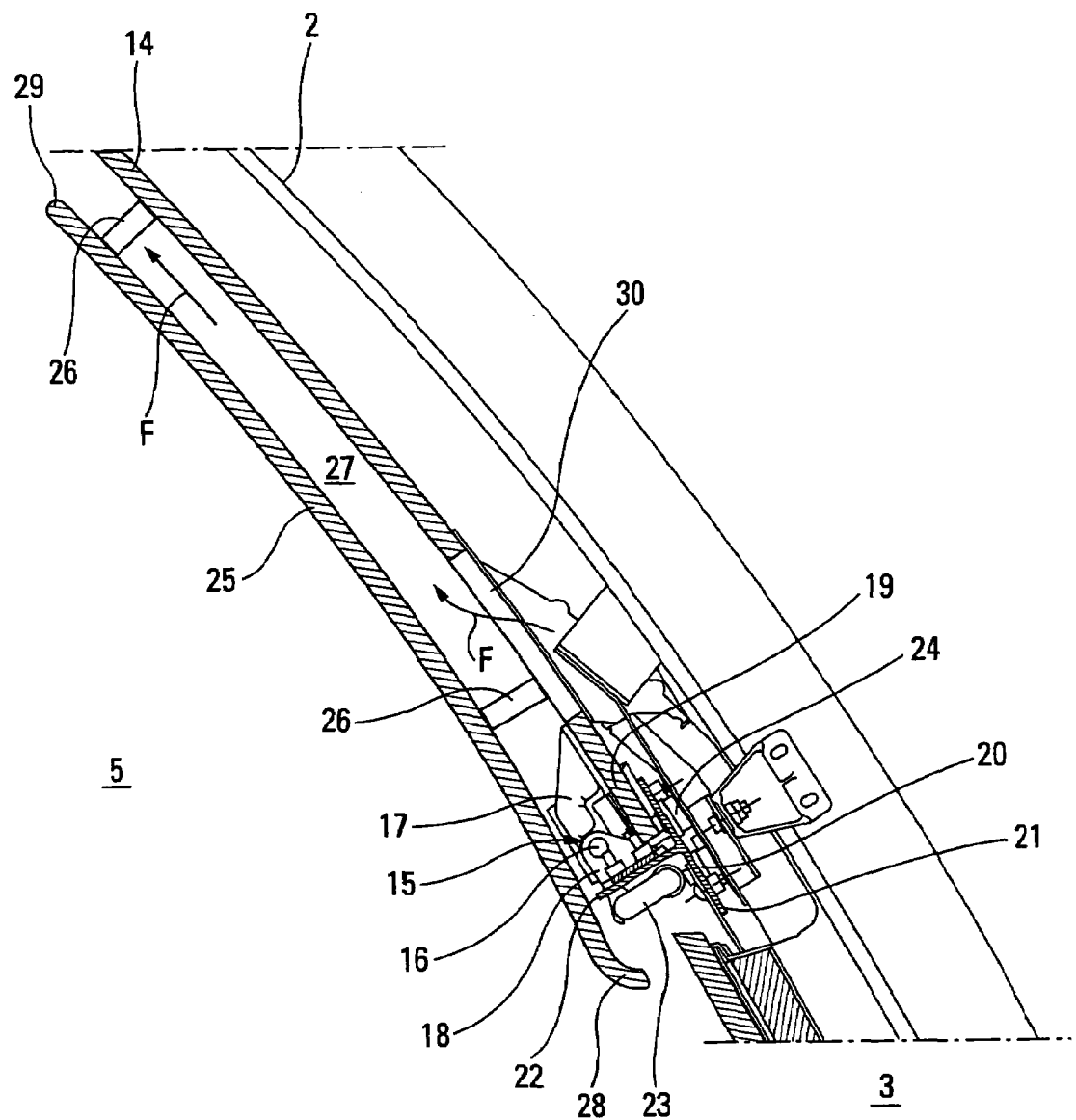
FIGS. 2 and 3 show, in an enlargement, the connection of one of the one-piece lateral panels respectively, at the bottom, to the fuselage of the aircraft and, at the top, to the corresponding structural duct.

As FIGS. 1 and 2 show, each lateral panel 14 is connected to the corresponding structure wall 2 via a connection by an articulation 15 with a longitudinal axis 16 (parallel to the plane P and to the floor), about which the panel 14 can occupy a raised position depicted in FIGS. 1 and 2 and a lowered position shown in broken line in FIG. 1, as will be seen later on.

In this embodiment, the connection by articulation 15 is of the two-leaf hinge type with leaves 17, 18. For that, one of its leaves 17 is secured to the longitudinal lower edge 19 of the panel 14, while the other leaf 18 is secured to a section piece 20 running longitudinally along the lateral wall 2 of the fuselage just above the windows 3. For example, the section piece 20 has a T-shaped cross section, the crossbar 21 of which T is attached fixedly to the wall of the fuselage, while the leg 22 of the T receives, on its upper lateral side in FIG. 2, the corresponding leaf 18. It will also be noted that the lower lateral side of the leg 22 of the T section piece 20 bears a lighting strip 23. In order to best absorb vibrations, the section piece 20 is fixed to the fuselage 1 by way of damping elements 24.

Furthermore, attached to each lateral panel 14 of the one-piece assemblies 10 is an external trim panel 25 which is fixed, by removable latches symbolized at 26, to the corresponding lateral panel 14. Each outer panel 25 covers the curved part thereof, that is to say the part which shadows the lateral side of the fuselage. A space 27 is formed, via said latches, between the outer panel 25 and the lateral panel 14 of each one-piece assembly 10. The longitudinal lower edge 28 of each outer panel 25 reaches down as far as the windows 3, of course concealing the section piece 20 and the lighting strip 23, while its longitudinal upper edge 29 comes close to the level of the corresponding structural duct 7. Thus, through openings 30 formed in each lateral panel 14, conditioned air, originating from a conduit not depicted running along the walls 2 of the fuselage, can flow into the space 27 between the panels 14 and 25 in the direction of the arrows F and be diffused into the cabin 5. Likewise, the lighting strip 23, which is concealed by the upper edge 28 of the outer panel 25 diffuses uniform indirect light laterally through the space provided.

Figure 3:
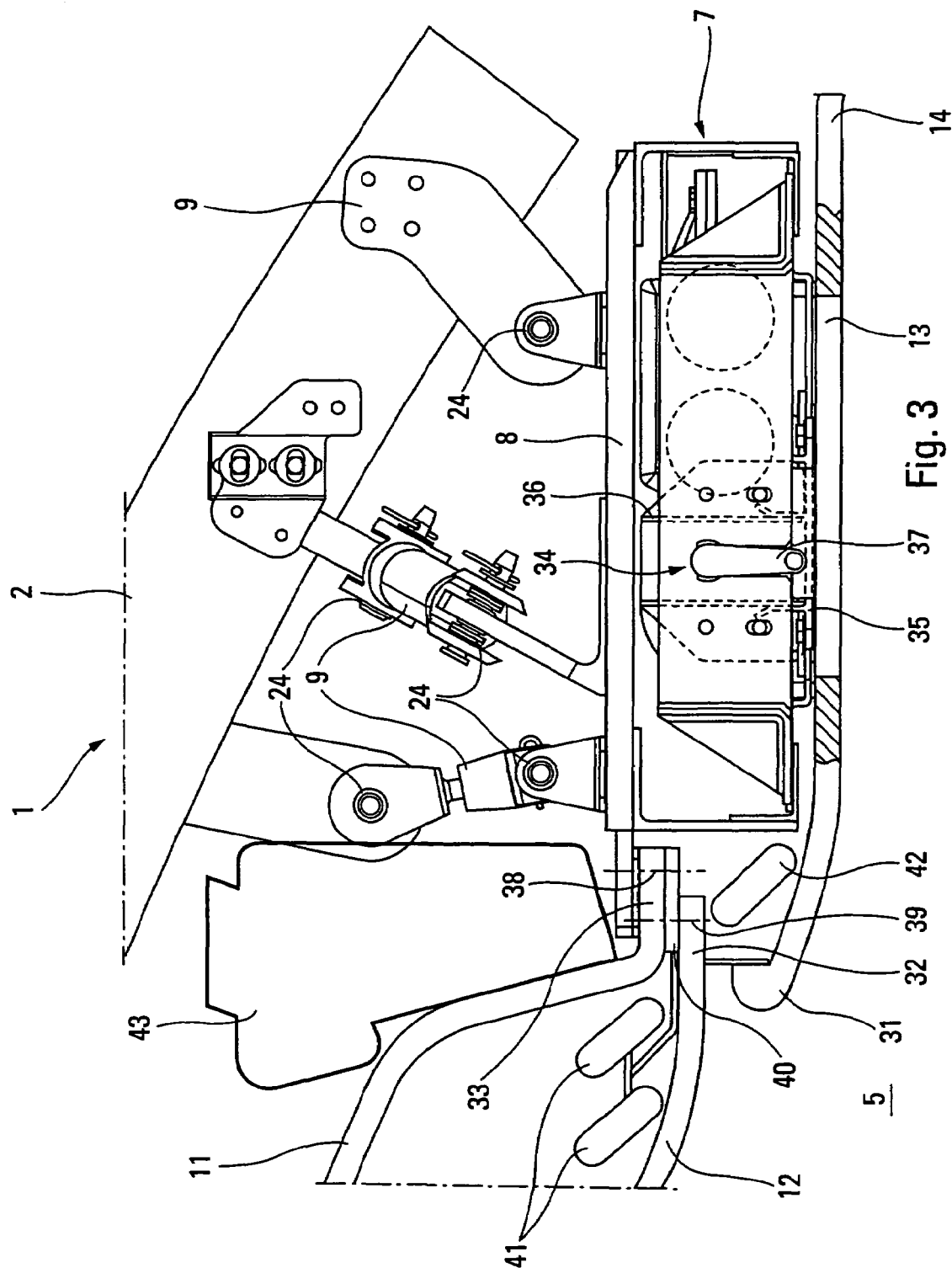

Each lateral panel 14 shadows the horizontal base of the corresponding structural duct 7 and its longitudinal upper edge 31 is extended, curved upwards, well beyond said duct in order to cover, as shown by FIGS. 1 and 3, the corresponding longitudinal edges 32, 33 of the inner ceiling panel 12 and of the dome 11. Formed strictly as needed in the horizontal part of the lateral panel 14 are openings 13 allowing the auxiliaries fixed in the structural duct 7 to be used and operated from the cabin 5.

In these figures, the lateral panels 14 depicted belonging to the one-piece assemblies 10 occupy the usual raised position for which they are connected to the respective structural ducts 7. For that, fixing means 34 are provided for connecting the panels 14 to the ducts 7, and these are preferably of the quick latch/unlatch type. For example, known latches of the "Harper" type may be used. These each comprise a part 35 fixed to the panel, a part 36 fixed to the structural duct and a pivoting lever 37 connecting the two parts together and operable from the outside. Thus, these latch fastening means 34 are invisible from the cabin 5 while at the same time being operable therefrom, for example from a card (not depicted) slipped between two consecutive lateral panels or using a slot formed directly in the panel, as may be the case with the outer panels 25, connected to the one-piece lateral panels 14 by the latches 26.

As far as the attachment of the central element or dome 11 to the two structural ducts 7 is concerned, its longitudinal edges 33 are attached from the passenger cabin 5 (that is to say advantageously from underneath) against corresponding parts 8 of the ducts 7, and screws (or other fasteners) symbolized by a centerline 38 in FIGS. 1 and 3 secure the dome to the ducts in such a way that expansion and deformation of the fuselage in flight remain possible. Similarly, the longitudinal edges 32 of the lower ceiling panel 12 are attached against those of the dome 11 and fixed by screws or the like symbolized by a centerline 39. Advantageously, an intermediate plate 40 is sandwiched between the two corresponding edges 32, 33 of the dome and of the ceiling panel and carries lighting strips 41 provided in the internal space between the dome 11 and the lower ceiling panel 12, open in its central part.

It can advantageously be seen from FIGS. 1 and 3 that the upper edge 31 of each lateral panel 14 completely covers the edges 33 of the dome 11 and the edges 32 of the ceiling panel 12, and their fixings to the part 8 of the duct, so that these cannot be seen from the passenger cabin 5. A lighting strip 42 may also be provided in the space defined between the edges of the lateral panel, of the dome, of the ceiling panel and of the duct.

A conditioned-air distribution chamber 43 is also provided between the dome 11 and the upper part of the fuselage 1.

Just as with the fixing of the section pieces 20 to the lateral walls 2 of the fuselage, damping elements 24 are mounted at the reaction legs and fixing brackets 9 for the fixing of the structural ducts 7 to the fuselage 2, so as to absorb the vibrations generated along the three axes of the aircraft.

Simply by unlatching the removable fixing means 34, the lateral panels 14 made as a single piece pivot to their lowered position (depicted in broken line in FIG. 1) about the longitudinal axis 16 of the hinges 15, and this opens up access for maintenance on the various auxiliaries in the structural ducts and the fuselage and on the fixings of the dome and of the lower ceiling panel. As the fixings for the latter are accessible from the passenger cabin 5, they are very easy to remove, particularly to work on the upper part of the fuselage, and to refit. The maintenance operations are therefore less lengthy and less involved.

By producing the lateral panels as a single piece, reducing the number and magnitude of the gaps in the trim, the number of parts and fastenings needed prior to trimming the walls of the fuselage and therefore the mass and cost of the arrangement are reduced, the acoustic noise level in the cabin is also reduced, especially since vibration dampers are provided, the maintenance times are optimized by providing functional and structural separation of the panels from the structural ducts, and the useful space in the cabin and its esthetic appearance are improved.

From the foregoing, the interior arrangement achieves the objectives set out hereinabove and is particularly suited to the arrangement of a cabin for VIP passengers.

The invention claimed is:

1. An internal arrangement of walls of a fuselage of an aircraft delimiting a passenger cabin and supporting, at the upper part of said fuselage and, respectively, on each side of its longitudinal plane of symmetry, two longitudinal structural ducts spaced apart parallel to one another and through which aircraft auxiliaries run, said arrangement comprising:
   a longitudinal central element forming a dome connecting said structural ducts;
   an interior ceiling panel situated under said dome and facing toward said cabin; and
   two lateral cover panels arranged in such a way that:
      a lower edge of each lateral panel is articulated with respect to said fuselage, about a connection with a longitudinal axis, each panel thus being able to occupy a raised position in which it is connected to a respective one of said structural ducts near an upper edge of the respective structural duct and a lowered position in which it is distant from said respective structural duct; and
      the upper edge of each lateral panel is extended, in the raised position, beyond said respective structural duct to cover corresponding longitudinal edges of said dome and said ceiling panel.

2. The arrangement as claimed in claim 1, wherein openings are made in that part of each lateral panel that faces said corresponding structural duct.

3. The arrangement as claimed in claim 1, wherein each lateral panel is connected, in its raised position, to its corresponding structural duct by a quick latch/unlatch fixing component.

4. The arrangement as claimed in claim 1, and which comprises, along each lateral side of said fuselage, a support section piece fixed longitudinally to said lateral side of the fuselage and along which said respective lateral panel is mounted such that it can pivot about its connection.

5. The arrangement as claimed in claim 4, wherein each of said connections is defined by a hinge one leaf of which is fixed to the lower edge of said lateral panel and the other leaf of which is fixed to said section piece.

6. An arrangement as claimed in claim 1, wherein an outer trim panel is attached to each lateral cover panel while at the same time being spaced therefrom, wherein each outer panel covers, at the bottom, the connection of said respective lateral cover panel and extends, in the upper part, up to near said corresponding structural duct, and is connected to said lateral panel by a quick latch/unlatch fixing component.

7. The arrangement as claimed in claim 1, wherein said dome is attached from underneath, from said passenger cabin, against said parallel structural ducts and is fixed thereto.

8. The arrangement as claimed in claim 1, wherein said lower ceiling panel is attached from underneath, from said cabin, against said dome and is fixed thereto and to said structural ducts.

9. The arrangement as claimed in claim 4, wherein said structural ducts and said section pieces are fixed to the walls of said fuselage by damping elements.

* * * * *